3,788,915
REGENERATION OF SPENT ETCHANT
Michael Gulla, Newton, Mass., assignor to Shipley
Company, Inc., Newton, Mass.
Filed Feb. 9, 1972, Ser. No. 224,894
Int. Cl. C22d 1/00
U.S. Cl. 156—19
21 Claims

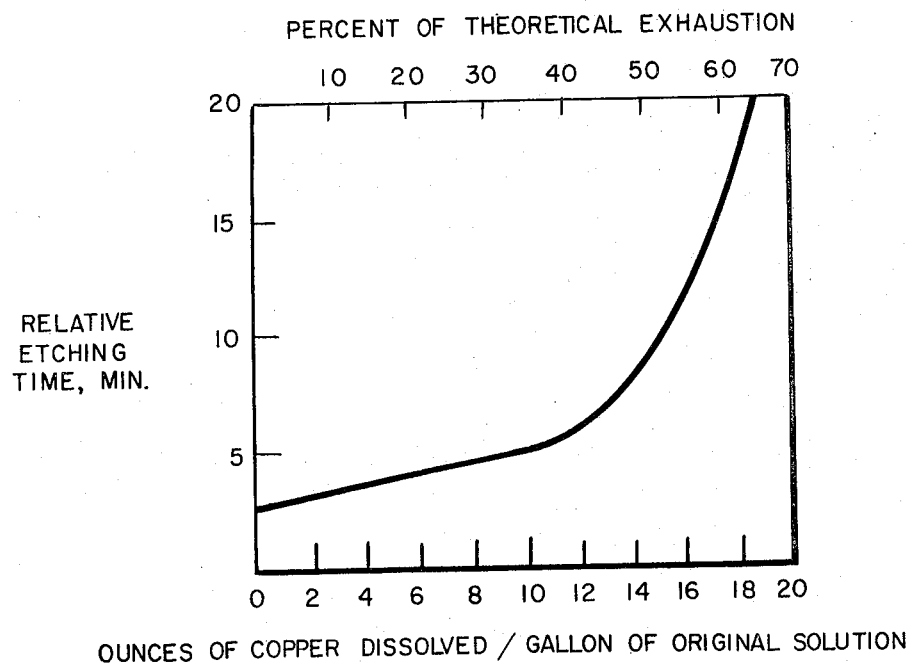
FIG. I
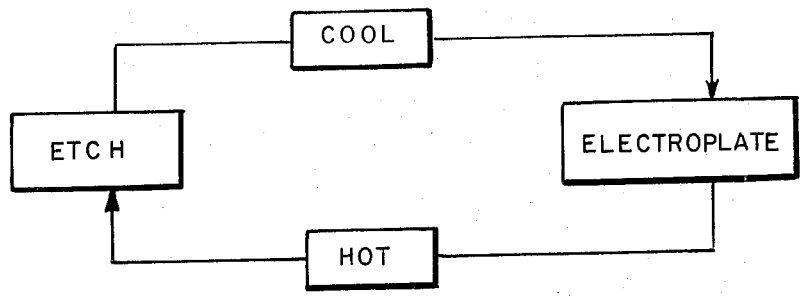
FIG. 2

ABSTRACT OF THE DISCLOSURE

This invention relates to a process for extracting dissolved metal as metal from a used etchant solution containing ferric ions as an oxidant while simultaneously regenerating the etchant for further use. The process comprising electrowinning a portion of the metal from solution under conditions effective for electrowinning, but not etching. These conditions include a substantial freedom from oxygen in the vicinity of the cathode, substantial freedom from solution agitation during the winning operation and preferably, for good cathode efficiency, relatively low solution temperature at the interface of the solution and the cathode, typically below 120° F. The process is economical because the ferric ion reduced to ferrous ion during the etching operation is oxidized back to the ferric form at the anode during the electrowinning process. Thus, the etchant is regenerated and suitable for re-use. Moreover, only a portion of the dissolved metal is removed from solution, the remainder being left in solution. The process is an important contribution to pollution abatement efforts as it eliminates the need for dumping spent etchant and dissolved metal wastes resulting from an etching operation.

BACKGROUND OF THE INVENTION

(1) Field of the invention

This invention relates to a process for removing dissolved metals from an etchant containing ferric ions as an oxidant and to a continuous etching process.

(2) Description of the prior art

Ferric chloride etchants are well known in the art and find widespread use for etching copper, copper alloys, Kovar, and steel in such applications as printed circuit fabrication, electronics, photo-engraving and metal finishing. Typical applications include leads on solid-state microcircuit ceramic flat packages and fine-line metallization masks. For these applications, the ferric chloride etchants are the most accepted and, widely-used etchants at the present time because they have a high tolerance for dissolved metal, especially copper, and are low in cost.

The composition of a typical ferric chloride etchant is well known in the art and principally is ferric chloride dissolved in water, with concentrations of ferric chloride typically ranging from 28 to 42% by weight. Free acid is present because of the hydrolysis reaction between the ferric chloride and water. The hydrochloric acid is usually supplemented by additional amounts of hydrochloric acid to hold back the formation of an insoluble precipitate of ferric hydroxide.

Commercial formulation also contain wetting and antifoaming agents.

In use of the aforesaid etchants, using copper as an example as it constitutes a preferred embodiment of this invention, the ferric ion oxidizes metallic copper to the cuprous form with formation of green ferrous chloride according to the following equation:

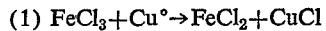

In the body of the solution, cuprous chloride is further oxidized to cupric chloride, especially in a spray etching operation where the etchant is highly aerated, which acts as a secondary etchant as the cupric ion oxidizes the copper metal to cuprous form according to the following equation:

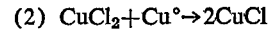

It has been determined that at 50% exhaustion (14 ounces per gallon of dissolved copper) of a 42° Baumé ferric chloride solution, 84% of the copper is etched according to Equation 2. In practice, when a 42° Baumé solution contains 8 ounces of dissolved copper per gallon, the etch time becomes longer than desired. The relationship between the relative etching time and dissolved copper concentration is illustrated in FIG. 1 of the drawings. Because of the decrease in etch rate with increasing dissolved copper content, at 8 ounces per gallon of dissolved copper, the etch is typically discarded. In the past, regeneration of the spent ferric chloride etchant has not been seriously considered because of the relatively low initial cost of the etchant. However due to recent strict code regulations which in some cases prohibit the dumping of materials which adversely effect the ecology, the dumping of spent ferric chloride etchants, particularly those containing dissolved copper, is no longer permitted. Consequently, there now exists a need for an inexpensive regeneration process, especially one where dissolved metal values can be recovered in commercially useful form such as in the form of scrap metal or in a form suitable for use as a raw material.

Various methods have been proposed for the treatment of such spent etchants. For example, it has been proposed to vaporize water from the etchant and collect the solids. However, this method is uneconomical and the recovered solids have to be further treated to recover the components in useful form. Alternatively, it has been proposed to pass the etchant through cooling means to precipitate the dissolved metal from solution, remove the precipitate such as by filtration from the etchant and recirculate the filtrate to the etching apparatus as fresh etchant. This method has certain desirable aspects as it is relatively inexpensive and simple, but insufficient metal values precipitate even at the low temperatures used so that the filtrate still contains a substantial quantity of dissolved metal and the etching capacity of the recirculated etchant is not as high as might be desired. Furthermore, the precipitate is in a form believed to be the oxide, hydroxide or some other salt and as such, does not have the value of elemental scrap metal. Moreover, the recirculated etchant must be oxidized to convert the ferrous ion to the ferric ion to make the same useful as an etchant.

SUMMARY OF THE INVENTION

The process of the subject invention provides for recovery of metal substantially in metallic form from the aforesaid used ferric chloride etchants. The process is capable of continuous operation if desired, is economical, provides metal substantially in metallic form and simultaneously regenerates the etchant in a form suitable for reuse, if desired.

The process for treating the etching solution in accordance with the invention comprises electrowinning a portion of the desired metal from the solution under conditions favorable to electrowinning and unfavorable to etching. Electrowinning is herein defined as the electrolytic recovery of metal from solution. The conditions suitable for electrowinning include a substantial freedom from oxygen in the vicinity of the cathode, a substantial freedom from solution agitation during the treatment operation and preferably, a relatively low solution temperature at the interface of the solution and cathode, preferably below 120° F. in the vicinity of the cathode and at the interface of the cathode and the solution, a temperature preferably not in excess of 90° F.

Since some dissolved metal is tolerable in the regenerated etchant solution, and in the case of copper, may be desirable as the copper will be converted to the cupric form and act as a secondary etchant, only a portion of the dissolved metal is removed by electrowinning. In contrast, where electrolytic procedures have been attempted for treatment of spent etchants in the prior art such as in the treatment of spent ammonium persulphate etchants, substantially all of the dissolved metal is removed so that the remainder of the solution may be dumped. Thus, the process for regeneration in accordance with this invention is substantially less expensive than prior art processes as less metal is removed. It is not necessary to remove remaining small concentrations of dissolved metal from dilute solutions as would be necessary in prior art procedures. In this respect, it should be noted that the removal of the last remaining dissolved metal from a dilute solution is the most expensive part of the recovery operation because of poor cathode efficiency.

In addition to the cost advantages described above, the process of this invention has the further advantage that the treated solution may be reused after removal of the metal with little or no replenishment required as the bulk of the ferrous ions is oxidized to the ferric ion during the electrowinning process. However, in some instances, oxidation of the ferrous ion to the ferric ion may be required if all of the ferrous ion is not so converted at the anode. Moreover, where copper is the dissolved metal, some oxidation of the cuprous form of the copper to the cupric form might be required to obtain the use of the cupric ion as a secondary etchant. The oxidation of the ferrous and cuprous ions can be performed quite simply by bubbling air through the etchant solution or by use of a spray etcher where aeration will oxidize the materials. Thus, the chemicals comprising the etching solution are not lost and there are no materials to dump. As a consequence, it is considered that the discovery described herein is a valuable contribution to pollution abatement efforts.

DESCRIPTION OF THE DRAWINGS

FIG. 1, as described above, is a graphical representation of relative etching time as a function of dissolved copper in a ferric chloride etching solution;

FIG. 2 is a schematic representation of a continuous process in accordance with the invention.

DESCRIPTION OF THE PREFERRED EMBODIMENTS

Figure 3:
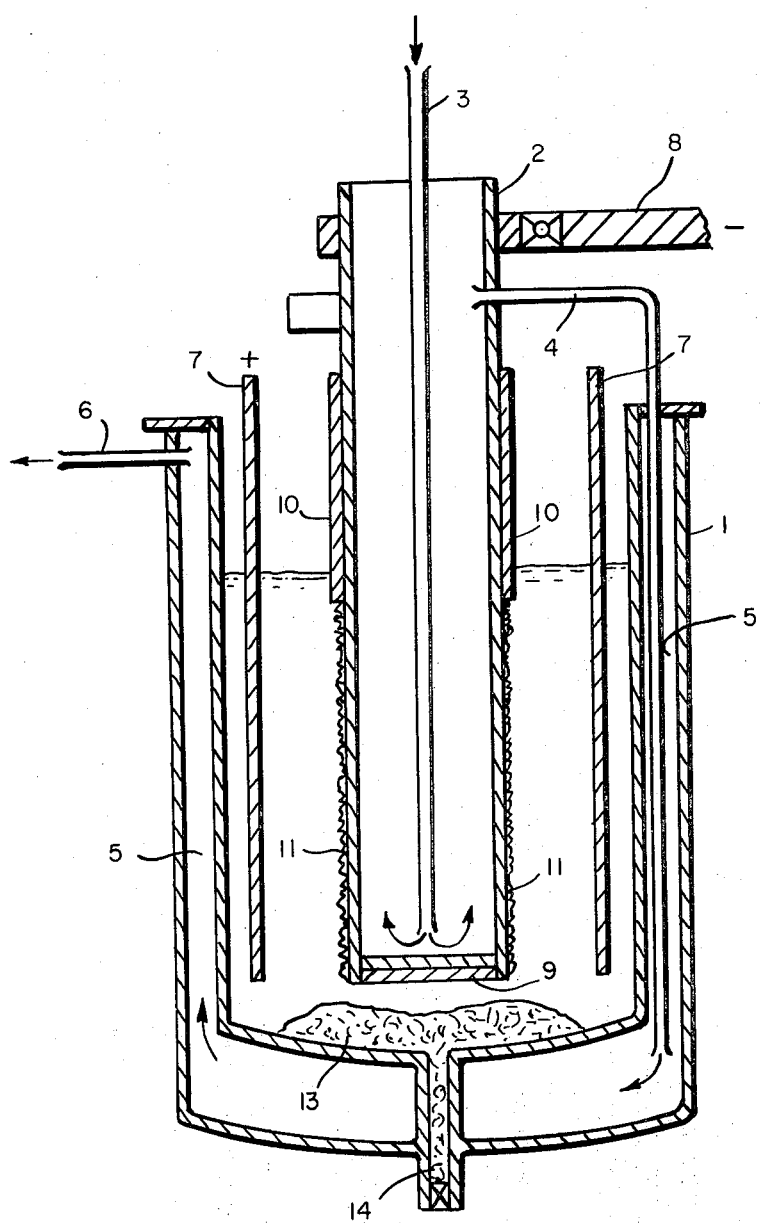
FIG. 3 is a sectional elevational view of an electrowinning apparatus in accordance with the invention.

As noted above, ferric chloride etchants are used primarily for the etching of copper, copper alloys, Kovar and steel. For purposes of this invention, the etchant solutions are used in conjunction with all metals heretofore etched though copper and iron are the preferred metal for reasons to be described in greater detail below.

In the electrowinning apparatus, in accordance with the invention, metal is plated out of solution on a cathode preferably using an insoluble anode. Using copper as an example, the maximum amount of copper that can be removed theoretically is 0.042 ounce of copper per ampere-hour. Thus, the cathode efficiency of the overall process is expressed as a percentage based upon the amount of copper actually removed relative to the amount of copper that may be theoretically removed. Because copper is removed from an etching solution formulated to dissolve copper, it would be expected that cathode efficiency would be low. However, it is an unexpected discovery of this invention that efficiencies of 90% or higher can be obtained by decreasing the etching potential of the etching solution. This is accomplished by a combination of procedures including one or more of avoiding solution agitation, reducing oxygen content in the vicinity of the cathode and preferably by maintaining a relatively low solution temperature as least at the interface of the etching solution and the cathode.

With regard to reducing the oxygen concentration in the cathode area, it should be understood that in the electrowinning process, oxygen is generated on the surface of the anode. It is this oxygen that is preferably kept out of the cathode area. This is readily accomplished by spacing the anodes at a suitable distance from a cathode while avoiding solution agitation, or by bagging the anodes. The generation of oxygen is desirable as it oxidizes the ferrous ion to the ferric form thereby regenerating the etchant.

With regard to solution temperature, the entire etching solution may be cooled to obtain reasonably high cathode efficiency. However, the process is also operative at temperatures of 120° F., and higher. At these temperatures, cathode efficiency is typically in the order of about 25 to 45% dependent upon temperature and other conditions such as current density. From an economy standpoint, it is desirable to treat the etching solution at the temperature at which the etching solution is used for etching so as to avoid cooling the solution prior to electrowinning and reheating where necessary prior to etching. In one embodiment of this invention, by use of a cooled cathode as will be discussed in greater detail below, a hot solution may be treated to remove metal with high cathode efficiency and without the need for either cooling or heating the bulk of the etching solution. The reason for this is that a cooled cathode results in a lower temperature at the interface formed between the solution and the cathode. It is an unexpected discovery of this invention that cathode efficiency is higher when a warm solution is regenerated using a cold cathode than when the entire etching solution is cooled to below room temperature.

The operating temperature of ferric chlorine etchant, is not critical. Satisfactory results are obtained with temperatures below normal ambient room temperature to the boiling point of the etchant, though it is generally desirable to maintain the temperature at room temperature. At the higher temperature above room temperature, a faster etching rate is possible though the etchant is more difficult to control.

One embodiment of the invention for etching and regeneration is illustrated in FIG. 2 of the drawings which is a schematic representation of the process of the invention. In a batch operation, using copper as an example, copper metal is etched in the etching apparatus until the concentration of copper in solution becomes too high for practical operation. With reference to FIG. 1 of the drawings, it can be seen that this concentration is approximately between 12 and 16 ounces of copper per gallon of solution as at this concentration, the etching rate is too slow for practical operation. When the copper concentration reaches this level or lower dependent upon practices in the art, the etchant is pumped to electrowinning apparatus.

In order to remove copper from the etching solution and prevent the etching solution from redissolving the dissolved copper as well as attacking the material of the apparatus, if the etching solution is used hot, cooling means may be provided to decrease the temperature of the etchant and thereby reduce its etching potential. These cooling means may be external such as by heat exchanger or preferably internal in the apparatus such as by a cooled cathode. The cooled cathode is preferred so that the etching solution is cooled at that point where metal is plating out of solution while the remainder of the solution if used hot, remains hot. This provides unexpectedly greater cathode efficiency and also, is more economical as the bulk of the solution need not be heated and cooled during the cycle.

The conditions within electrowinning apparatus are dependent in part upon the composition of the metal etched. In general, the current density may range from 0 for some metals wherein an immersion deposit forms on the cathode to in excess of 150 amperes per square foot (a.s.f.) for the more difficult to plate metals. Preferably, the current density varies between about 20 and 140 a.s.f. at sufficient applied voltage to maintain the desired current density.

In the practice of this invention, it should be noted that in the most preferred embodiment, solutions are treated that have been used to etch copper and iron. The reason for this is that with metals other than copper and iron, it is difficult to selectively plate-out these metals without also plating out iron. As a result, the etched metal builds up in concentration while the iron concentration decreases. With copper, selective plate-out of copper is possible. With iron, since the etching solution is a ferric chloride solution, there is no other metal in solution and no need for selectivity.

Following electrowinning of dissolved metal from the etchant, it is pumped back to the etching apparatus. The etchant if operated at elevated temperatures, may be heated externally of the etching apparatus by passing it through heat exchanger or heating elements may be contained in the etching apparatus. At this point, the etchant is suitable for reuse with minor replenishment as the ferrous ion is oxidized to the ferric form by the anode during the electrowinning process. In this respect, it may be necessary to bubble air through the etching apparatus to convert any residual ferrous ion to the ferric form or such conversion may take place by aerial oxidation in a spray etching operation.

The above described process is based upon a batch operation. It should be understood that the process is also capable of continuous operation where a stream of etchant is continuously passed from the etching apparatus to the plating apparatus for plate-out and back to the etching apparatus. Conditions of temperature, etchant strength, and current density are adjusted so that the concentration of the dissolved metal following regeneration of the etchant and upon introduction to the etching apparatus is such that the etchant will have sufficient capacity to dissolve more metal. Again, with reference to FIG. 1 of the drawings, it can be seen that for copper, between 12 and 16 ounces of copper can be dissolved in the etchant prior to a substantial decrease of the etching rate. Alternatively, copper can be plated from the etching solution during the electrowinning process down to about ¼ to 1 ounce of copper per gallon of etchant without substantial decreases in the plating efficiency. Thus, in general, it is desirable to etch metal to a point of saturation from a practical standpoint and to decrease the dissolved metal concentration in the electrowinning operation to a point where plating efficiency is not substantially impaired. For copper, a broad range comprises up to 16 ounces of copper per gallon in the etching operation and down to about ¼ ounce of copper per gallon in the electrowinning operation.

FIG. 3 is a cross sectional representation of an apparatus suitable for plating dissolved metal from a spent etchant solution in accordance with the invention. The apparatus comprises a tank 1, which may be a double walled non-metallic tank such as a double walled polyethylene tank in combination with symmetrically spaced, chemically inert anodes. A cathode 2 is centrally located in tank 1, is preferably hollow to permit a flow of coolant therethrough and is of a corrosion resistant material, preferably a metal such as stainless steel. Coolant is supplied to cathode 2 by a tube 3 extending through the length of the cathode having an outlet at the bottom thereof. Coolant flows downward through pipe 3 up through cathode 2 and leaves the cathode through outlet 4. This is a desirable configuration as it provides for localized cooling only in the cathode area while the remainder of the solution is not cooled. Therefore, the etching potential of the solution is decreased in the cathode area. The solution is not appreciably cooled because heat removed by cooling through the cathode is partially replaced by passage of current through the solution. If desired, outlet 4 may be serially connected to cooling jacket 5 of tank 1, though in preferred embodiments, this jacket is not necessary. The coolant emerges from jacket 5 through outlet 6. In combination with cathode 2, is preferably a plurality of anodes 7 of a non-dissolving conductive material such as graphite symmetrically spaced around tank 2. Current is supplied to the electrodes by means of a rectifier (not shown) through copper bus bar 8 in contact with another bus bar 9 leading to copper plate 10 which feeds cathode 2. The copper bar 9 is insulated by insulation layer 11. The cathode is preferably also coated with insulation in those areas where plate out is not desired. Thus, there would be insulation layers 12 and 13 at the top and bottom of cathode 2, respectively. In operation, a loose granular denditric layer of metal 14 forms on the exposed surface of cathode 2. The metal layer is readily stripped from the cathode such as by a circular scraping blade (not shown) capable of sliding over the surface of cathode 2. The metal from the surface of cathode 2 settles on the bottom of the plating tank as a layer 15 where it may be removed through outlet 14 or collected in a basket (not shown). Surprisingly, the metal on the bottom of the plating tank is not dissolved by the etchant. This is believed to be due to the formation of a surface oxide layer on the metal in the stagnant non-aerated etchant which passivates the metal thus preventing dissolution. The metal must be removed from the plating apparatus continuously or at given intervals.

EXAMPLE 1

Approximately 30 gallons of a 34° Baumé ferric chloride solution is used to fill a spray etching apparatus and copper is dissolved from selected areas of copper laminated epoxy panels. The copper laminate used is one ounce panel, approximately 0.0013 inch thick. The etchant is used at a temperature varying between about 70 and 80° F. at a pH well below 1. When the total dissolved copper concentration in solution reaches about 16 ounces per gallon, or 540 ounces total in the 30 gallons of etchant, etching is discontinued.

The spent etchant is pumped to a plating apparatus consisting of a polyethylene plating tank, 22 inches in diameter, 32 inches high and having a domed bottom with a centrally located outlet. A fixed cylindrical stainless steel cathode having an 8 inch diameter, 20 inch length and having an overall plating surface area of 500 square inches is inserted centrally within the plating tank. The ends of the cathode are coated with epoxy. Current is brought to the cathode through a one inch diameter copper bus bar and distributed through the cathode by a copper plate welded to the cathode surface. The cathode is provided with a cooling water inlet and outlet. Ten graphite anodes measuring 1 inch by 5 inches having a length of 34 inches are placed around the perimeter of the plating tank. Total working surface area of the anode is about 1200 square inches. Current is supplied by a 750 ampere-12 volt rectifier. The plating tank is equipped with connecting bus bars for anodes and cathodes, holders, fixtures, pump, pipelines and associated equipment necessary to handle solutions and copper sludge.

The etching solution initially enters the apparatus at about 75° F. and no agitation is used in the plating tank. A current density of about 40 a.s.f. is supplied and copper plates out at a rate of about 1 ounce per gallon of solution per hour. Total plating time is about 14 hours and the total weight of copper plated from solution is about 420 ounces. The copper remaining in solution is about two ounces per gallon.

Following electrowinning of the copper, the etchant is pumped to the etching tank and is replenished with small amounts of hydrochloric acid. The etchant is then suitable for reuse.

The above procedure can be repeated through numerous cycles.

EXAMPLE 2

All tests were carried out with a gallon of solution contained in a four liter beaker. A ceramic crock acted as a water jacket to cool the solution. The cathode was a type 321 thin walled stainless steel tube, 3.4 inches in diameter and about 18 inches long. A plating area of 12.8 square inches was provided by stopping off the tube at 5.43 inches from the lower end with vinyl tape. The end was closed with a rubber stopper and two plastic tubes through the stopper were used to pass cooling water into and out of the cathode. The same cooling water was led into the cooling jacket around the beaker holding the electrolyte. Four anodes, ½ inch by ¾ inch by 12 inches were cut from HELX 1058 National Electrolytic Graphite and hung around the rim of the beaker equi-distant from the centrally located cathode to ensure uniform current density. The anode to cathode spacing was about 2 inches. Sufficient voltage was supplied to produce a constant current of 16 amperes resulting in a cathode current density of 0.05 ampere per square inch and an effective anode current density of 0.11 ampere per square inch. Temperature in the bath and cooling jacket were measured periodically during an eight hour run as well as the voltage across the cell. The cathode was inspected at intervals and the deposit scraped off if possible. The test conditions and results are given in the attached table.

| | |
|---|---|
| Voltage range; start-finish | 3.9–4.7 |
| Bath temperature, ° F.; start-finish | 54–54 |
| Temperature in water jacket, ° F.; start-finish | 34–40 |
| Copper, ounces/gallon start | 10 |
| Copper, ounces/gallons finish | 5 |
| Copper removed, ounces/gallon | 5 |
| Rate of copper removal, ounce/gallon/hour | 0.67 |
| Percent efficiency of copper removal | 52.6 |
| Amount of ferrous converted to ferric ounces/gallon/hour | 7.0 |
| Anode efficiency, percent | 42 |

The copper deposit was about 1/16 inch thick, very hard and somewhat adherent to the cathode surface, slightly rough and with vertical lines. It was removed with some difficulty though this problem is readily overcome by applying a thin layer of a suitable polymer to the cathode surface such as Teflon, polystyrene and the like, whereupon, the metal deposit can be removed as a sleeve by sliding the same from the cathode.

EXAMPLE 3

The ferric chloride solution of Example 1 is used to etch nickel. When the solution contains about 4.5 ounces of nickel per gallon of solution, using the apparatus of Example 2, the nickel is removed at a current density in excess of 140 a.s.f. to obtain a powdery deposit.

EXAMPLE 4

The procedure of Example 3 is repeated substituting stainless steel for nickel. A current density of about 50 a.s.f. is used to obtain the deposit.

EXAMPLE 5

The procedure of Example 3 is repeated substituting Kovar for nickel. A current density of about 20 a.s.f. is necessary to obtain the deposit.

EXAMPLE 6

The procedure of Example 1 is repeated with modification to make the process continuous. The modification comprises decreasing the size of the spray etching apparatus to 10 gallons and maintaining a 30 gallon reservoir in the regeneration equipment. Etchant is continuously recirculated slowly from the etchant apparatus to the regeneration equipment at a rate of 5 gallons per hour. In this way, copper is continuously etched at the rate of 1 ounce per gallon per hour of solution and removed in the regeneration apparatus at about the same rate.

What is claimed is:

1. A process for recovering dissolved metal values from a ferric chloride etching solution comprising ferric ions as an oxidant and regenerating said etching solution, said process comprising placing said solution in contact with an anode and cathode combination and passing a current between said anode and cathode, said cathode being cooled to a temperature below the temperature of the etchant so as to lower the temperature of the etchant over its interface with the cathode to decrease the etching potential of the etchant, whereby said metal values will deposit on said cathode and ferrous ions are oxidized to ferric ions at said anode making the etchant suitable for re-use.

2. The process of claim 1 where only a portion of the dissolved metal values are removed from the etching solution.

3. The process of claim 2 where the dissolved metal values exclusive of the ferric ions, are decreased down to a minimum concentration of ¼ ounce per gallon of solution.

4. The process of claim 2 where the dissolved metal values are selected from the group of copper and iron.

5. The process of claim 4 where the dissolved metal values are copper.

6. The process of claim 1 where the etching potential is decreased further by avoidance of solution agitation.

7. The process of claim 6 where the temperature at the interface of the solution and cathode does not exceed 90° F.

8. The process of claim 6 where the etching potential is decreased further by maintaining the cathode area substantially free of generated oxygen.

9. The process of claim 6 where the cathode current density varies between about 0 and 150 amperes per square foot.

10. The process of claim 6 where the cathode current density varies between 20 and 140 amperes per square foot.

11. A process of continuously etching metals with a ferric chloride etching solution comprising ferric ions as an oxidant, said process comprising contacting said metal with said etching solution for a time sufficient to substantailly increase metal content in the etchant solution, contacting said solution with an anode and cathode combination and passing a current therebetween, said cathode being cooled to a temperature below the temperature of the etchant so as to lower the temperature of the etchant over its interface with the cathode to decrease the etching potential of the etchant, whereby said metal will deposit on said cathode and ferrous ions are oxidized to ferric ions at said anode, making said etching solution suitable for re-use.

12. The process of claim 11 where only a portion of the dissolved metal is removed from the etching solution.

13. The process of claim 12 where dissolved metal, exclusive of the ferric or ferrous ions, is decreased down to a minimum concentration of one quarter ounce per gallon of solution.

14. The process of claim 12 where the dissolved metal is selected from the group consisting of copper and iron.

15. The process of claim 12 where the dissolved metal is copper.

16. The process of claim 11 where the etching potential is decreased further by avoidance of solution agitation.

17. The process of claim 15 where the temperature at the interface of the solution and cathode does not exceed 90° F.

18. The process of claim 15 where the etching potential is decreased further by maintaining the cathode area substantially free of generated oxygen.

19. The process of claim 15 where the cathode current density varies between about 0 and 150 amperes per square foot.

20. The process of claim 15 where the cathode current density varies between about 20 and 140 amperes per square foot.

21. The process of claim 15 where copper is etched and removed at a rate of about 1 ounce per gallon of solution per hour.

References Cited

UNITED STATES PATENTS

| | | | |
|---|---|---|---|
| 2,748,071 | 5/1956 | Eisler | 204—130 X |
| 2,964,453 | 12/1960 | Garn et al. | 204—130 |
| 3,615,957 | 10/1971 | Konstantouros | 204—106 X |

GERALD L. KAPLAN, Primary Examiner

A. C. PRESCOTT, Assistant Examiner

U.S. Cl. X.R.

204—106, 112, 130, 141, 149